(12) United States Patent
Evans

(10) Patent No.: US 10,641,381 B2
(45) Date of Patent: May 5, 2020

(54) GEAR ASSEMBLY

(71) Applicant: Ford Global Technologies, LLC, Dearborn, MI (US)

(72) Inventor: Dominic Timothy Evans, Sevenoaks (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/419,057

(22) Filed: Jan. 30, 2017

(65) Prior Publication Data

US 2017/0227116 A1 Aug. 10, 2017

(30) Foreign Application Priority Data

Feb. 5, 2016 (GB) .................................. 1602148.7

(51) Int. Cl.
| | |
|---|---|
| *F16H 57/10* | (2006.01) |
| *F16H 57/12* | (2006.01) |
| *F16H 55/14* | (2006.01) |
| *F16H 55/18* | (2006.01) |
| *F16H 57/02* | (2012.01) |

(Continued)

(52) U.S. Cl.
CPC ............... *F16H 57/12* (2013.01); *F16H 1/06* (2013.01); *F16H 55/14* (2013.01); *F16H 55/18* (2013.01); *F16H 57/0006* (2013.01); *F16H 57/02004* (2013.01)

(58) Field of Classification Search
CPC . F16H 57/12; F16H 1/06; F16H 55/14; F16H 55/18; F16H 57/0006
See application file for complete search history.

(56) References Cited

U.S. PATENT DOCUMENTS

| | | | |
|---|---|---|---|
| 1,427,721 A * | 8/1922 | Christenson | ............ F16H 55/14 74/443 |
| 1,548,545 A | 8/1925 | Niederhauser | |

(Continued)

FOREIGN PATENT DOCUMENTS

| | | | | |
|---|---|---|---|---|
| CH | 277108 | A | 8/1951 | |
| CH | 277108 | * | 11/1951 | ............... F16D 3/76 |

(Continued)

OTHER PUBLICATIONS

Examination Report of Great Britain Patent Application No. 1602148.7, dated Jul. 19, 2016, United Kingdom Intellectual Property Office, 6 pages.

(Continued)

*Primary Examiner* — Zakaria Elahmadi
(74) *Attorney, Agent, or Firm* — Geoffrey Brumbaugh; McCoy Russell LLP

(57) ABSTRACT

A gear assembly comprising first and second gears configured to mesh with each other, the first gear comprising inner and outer ring elements and a resilient ring element disposed between and coupled to the inner and outer ring elements, the outer ring element comprising first gear teeth which mesh with second gear teeth of the second gear, wherein the first and second gears each comprise a positioning ring axially spaced apart from the first and second gear teeth, the positioning rings being configured to engage each other and limit the position of the first and second gear teeth relative to each other.

16 Claims, 6 Drawing Sheets

(51) Int. Cl.
*F16H 1/06* (2006.01)
*F16H 57/00* (2012.01)

(56) References Cited

U.S. PATENT DOCUMENTS

| | | | | |
|---|---|---|---|---|
| 2,307,129 | A * | 1/1943 | Hines | F16D 3/76 |
| | | | | 464/89 |
| 3,002,464 | A * | 10/1961 | Lee | F01C 21/02 |
| | | | | 418/126 |
| 3,206,993 | A * | 9/1965 | Niemann | F16D 3/56 |
| | | | | 74/410 |
| 4,674,351 | A * | 6/1987 | Byrd | F16D 3/76 |
| | | | | 464/90 |
| 4,748,865 | A * | 6/1988 | Umezawa | F16D 3/74 |
| | | | | 464/92 |
| 5,307,705 | A * | 5/1994 | Fenelon | B29C 70/84 |
| | | | | 264/242 |
| 5,452,622 | A * | 9/1995 | Fenelon | B29C 70/84 |
| | | | | 264/242 |
| 6,508,140 | B2 * | 1/2003 | Zaps | F16D 7/04 |
| | | | | 29/893.1 |
| 7,526,977 | B2 | 5/2009 | Masui | |
| 7,658,124 | B2 * | 2/2010 | Brosowske | F01L 1/02 |
| | | | | 74/409 |
| 7,793,753 | B2 * | 9/2010 | Bernhard | F16H 55/12 |
| | | | | 180/444 |
| 8,225,689 | B2 * | 7/2012 | Brosowske | F01L 1/02 |
| | | | | 74/397 |
| 8,726,753 | B2 | 5/2014 | Yang et al. | |
| 8,826,765 | B2 * | 9/2014 | Teramoto | F16H 55/14 |
| | | | | 74/434 |
| 9,856,964 | B2 * | 1/2018 | Dumanski | F16H 55/17 |
| 2005/0132834 | A1 * | 6/2005 | Takeuchi | F16H 55/14 |
| | | | | 74/431 |
| 2007/0180943 | A1 | 8/2007 | Daout | |
| 2011/0219898 | A1 * | 9/2011 | Miura | F16H 55/17 |
| | | | | 74/458 |
| 2013/0160589 | A1 | 6/2013 | Mittermair et al. | |
| 2015/0226303 | A1 * | 8/2015 | Dumanski | F16H 55/17 |
| | | | | 74/440 |
| 2017/0252795 | A1 * | 9/2017 | Ikeda | F16H 55/14 |
| 2018/0216716 | A1 * | 8/2018 | Vann Lieshout | F16H 55/18 |

FOREIGN PATENT DOCUMENTS

| | | |
|---|---|---|
| DE | 102011120676 A1 | 6/2013 |
| JP | 2001116114 A | 4/2001 |
| JP | 2001132822 A | 5/2001 |

OTHER PUBLICATIONS

European Patent Office, Extended European Search Report Issued in Application No. 17150375.8, dated Jul. 4, 2017, Germany, 10 pages.

* cited by examiner

GEAR ASSEMBLY

CROSS REFERENCE TO RELATED APPLICATION

The present application claims priority to Great Britain Patent Application No. 1602148.7, filed on Feb. 5, 2016. The entire contents of the above-referenced application are hereby incorporated by reference in its entirety for all purposes.

TECHNICAL FIELD

This disclosure relates generally to a gear assembly and particularly, although not exclusively, relates to a gear assembly for an internal combustion engine.

BACKGROUND

As recognized by the inventors herein, some background information is provided. Gear tooth meshing is a relevant feature that often requires of control gear tooth positions to micron levels for optimum efficiency, durability and low noise (rattle and whine). However, manufacturing tolerances, component dynamics and differences in thermal expansion rates mean that it is very difficult to keep the mating gear teeth in the optimum positions relative to one another. The conventional methods of dealing with this are to introduce tight tolerance control, similar materials, and backlash control features to keep the backlash and positional error to a minimum. These conventional methods add significant cost, weight and complexity to gear drive systems. Furthermore, backlash control features (like scissor gears) often involve a compromise, for example trading off rattle control versus whine control.

SUMMARY

According to an aspect of the present disclosure, there is provided a gear assembly comprising first and second gears configured to mesh with each other, the first gear comprising inner and outer ring elements and a resilient ring element disposed between and coupled to the inner and outer ring elements, the outer ring element comprising first gear teeth which mesh with second gear teeth of the second gear, wherein the first and second gears each comprise a circular positioning ring axially spaced apart from the first and second gear teeth, the positioning rings being configured to engage each other and limit the position of the first and second gear teeth relative to each other.

The first gear positioning ring may be connected to the first gear outer ring element. For example, the first gear positioning ring may be integral with the first gear outer ring element. The first gear positioning ring may be concentric with the first gear outer ring element.

The first and/or second gear positioning rings may comprise a resilient outer layer.

Each of the first and second gear positioning rings may have an outer diameter less than an outside diameter of the respective first and second gear. The outside diameter may be measured from tops of the respective first and second gear teeth. Each of the first and second gear positioning rings may have an outer diameter greater than a root diameter of the respective first and second gear. The root diameter may be measured from roots or bases of the respective first and second gear teeth. The first and second gear positioning rings may have outer diameters that are approximately the average of the outside and root diameters of the respective first and second gears.

An outer diameter of the first gear positioning ring may substantially correspond to a pitch circle diameter of the first gear. An outer diameter of the second gear positioning ring may substantially correspond to a pitch circle diameter of the second gear. The pitch circles of each gear may correspond to circles with diameters that result in the same gear ratio as the first and second gears, the circles contacting and rolling without slip. The pitch circle diameter of each gear may be between, e.g. midway between, the outside diameter and the root diameter of the respective gear.

The first and second gears may be spaced apart such that the inner and outer ring elements of the first gear may not be concentric. The resilient element may thus be pre-stressed prior to use. The gear assembly, e.g. spacing apart of the first and second gears, size of resilient ring element, and/or a resilience of the resilient element, may be configured such that the gear positioning rings remain in contact during use of the gear assembly. Rotational axes of the first and second gears may move apart, e.g. due to thermal expansions, bearing imperfections, dynamic motions of the shafts, etc. The pre-stress of the resilient element may be such that the first and second gears remain urged together under action of the resilient element despite the rotational axes of the first and second gears moving apart. The gear comprising the resilient element may be either a driving or driven gear.

The first and second gears may each comprise a further positioning ring axially spaced apart from the first and second gear teeth. The further positioning rings may be provided on an opposing side of the first and second gear teeth to the positioning rings. The further positioning rings may be configured to engage each other and limit the position of the first and second gear teeth relative to each other. Features described in respect of the positioning rings may apply equally to further positioning ring.

The resilient ring element may be bonded to the outer and/or inner ring elements. Additionally or alternatively, the resilient ring element may be coupled to the outer and/or inner ring elements by virtue of one or more splines.

An engine or motor vehicle may comprise the above-mentioned gear assembly.

To avoid unnecessary duplication of effort and repetition of text in the specification, certain features are described in relation to only one or several aspects or embodiments of the present disclosure. However, it is to be understood that, where it is technically possible, features described in relation to any aspect or embodiment of the disclosure may also be used with any other aspect or embodiment of the disclosure.

BRIEF DESCRIPTION OF THE DRAWINGS

For a better understanding of the present disclosure, and to show more clearly how it may be carried into effect, reference will now be made, by way of example, to the accompanying drawings. The figures are drawn to scale, although other relative dimensions may be used, if desired.

DETAILED DESCRIPTION

Figure 1A:
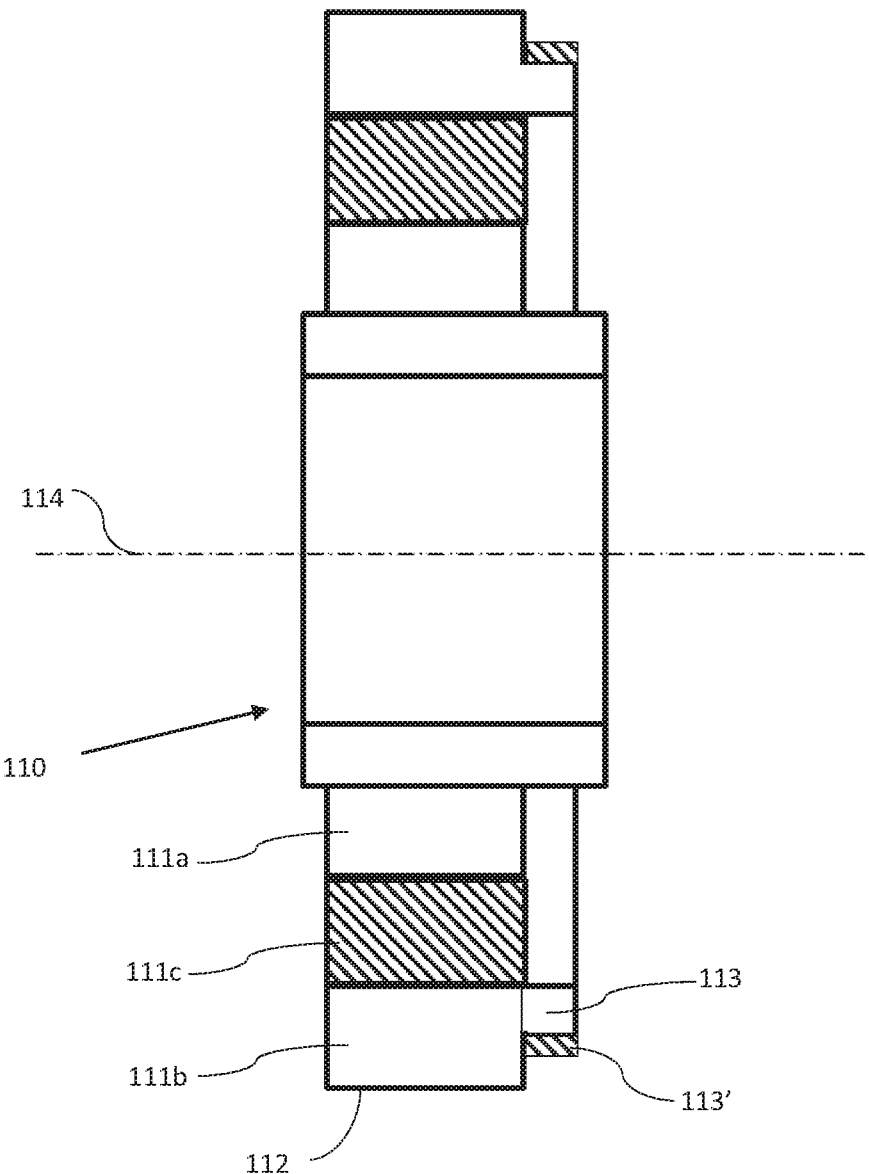
FIG. 1A is a side sectional view showing the first gear of a gear assembly according to an arrangement of the present disclosure.
Figure 1B:
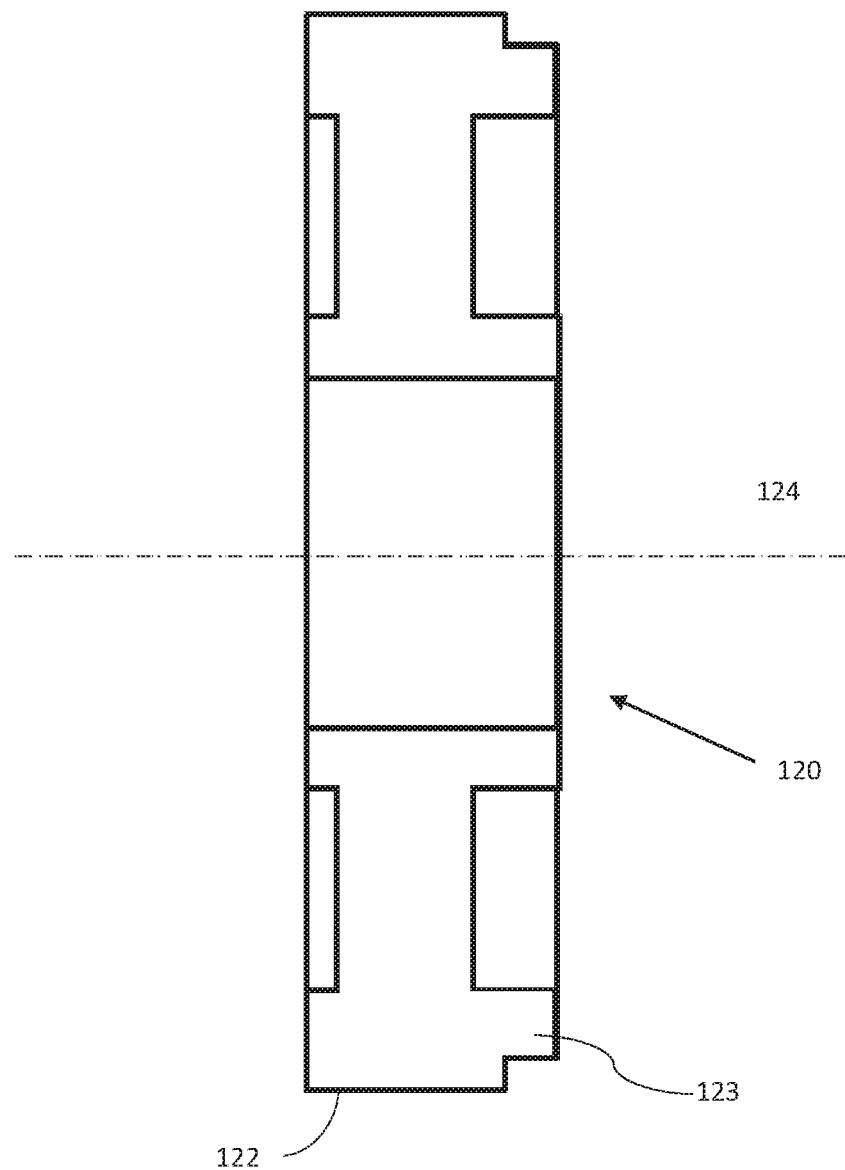
FIG. 1B is a side sectional view showing the second gear of a gear assembly according to an arrangement of the present disclosure.
Figure 2A:
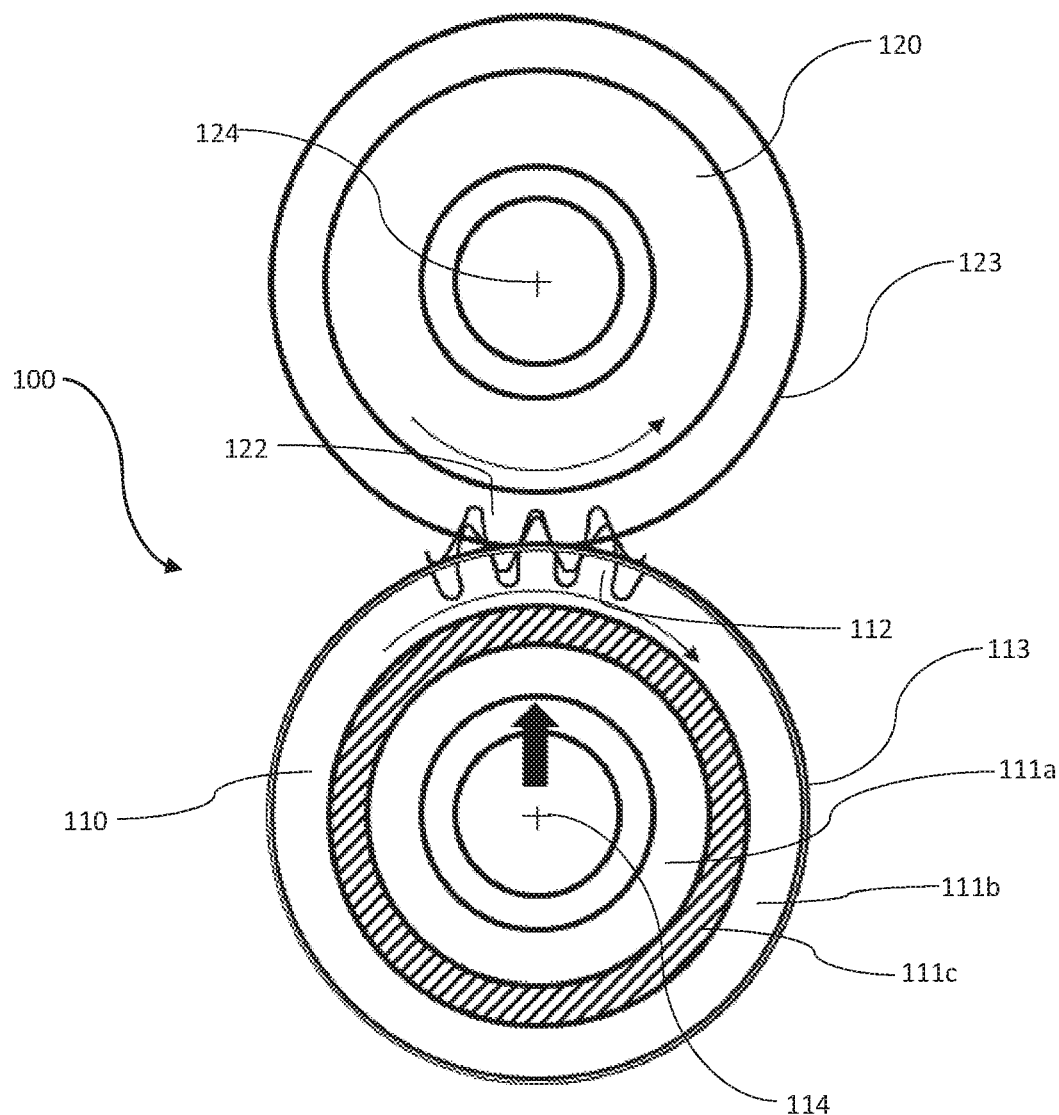
FIG. 2A is an end on view showing the first and second gears in mesh.
Figure 2B:
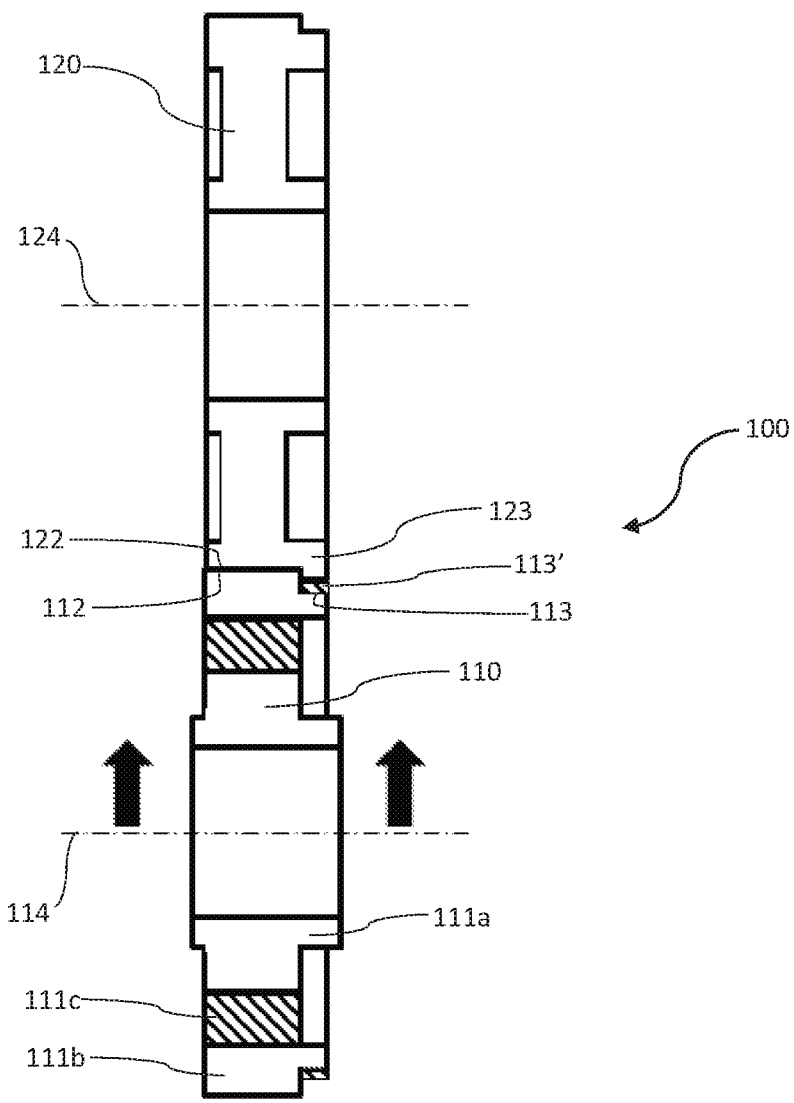
FIG. 2B is a side sectional view showing the first and second gears in mesh.
Figure 3:
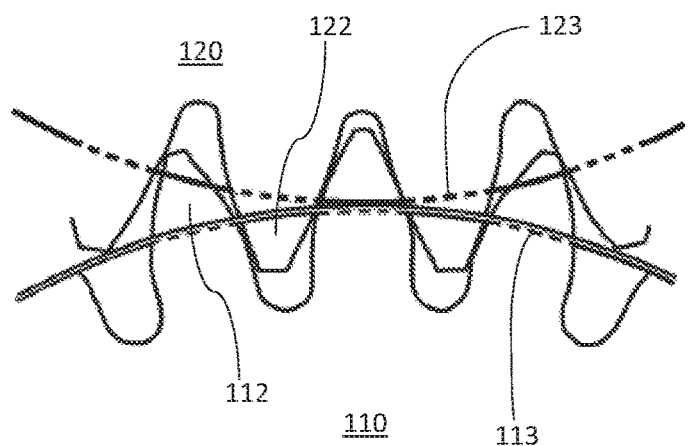
FIG. 3 is a partial enlarged view of FIG. 2A showing the contact zone of the first and second gears.

With reference to FIGS. 1 to 3, a gear assembly 100 according to an arrangement of the present disclosure comprises a first gear 110 and a second gear 120. The first and second gears 110, 120 are configured to mesh with each other such that rotation of one of the gears causes the other to rotate. Accordingly, the first gear 110 comprises first gear teeth 112 and the second gear comprises second gear teeth 122, the first gear teeth 112 meshing with the second gear teeth 122. The first and second gears 110, 120 rotate about respective axes 114, 124. The rotational axes 114, 124 may be substantially parallel, although in alternative arrangements the rotational axes may be non-parallel. Furthermore, the first and second gear teeth 112, 122 may extend in a direction parallel to the rotational axes 114, 124. Alternatively, the first and second gear teeth 112, 122 may not extend in a direction parallel to the rotational axes 114, 124, for example the gear teeth may be helical in arrangement such that the teeth form a helix about the respective rotational axis.

Referring to FIG. 1A, the first gear 110 comprises an inner ring element 111a and an outer ring element 111b, the outer ring element 111b being disposed radially outer of the inner ring element 111a. The inner ring element 111a is connected to or comprises a hub for receiving a shaft (not shown). Alternatively, the inner ring element 111a may be integral with a shaft. The outer ring element 111b comprises the first gear teeth 112.

A resilient ring element 111c is provided between the inner and outer ring elements 111a, 111b. The resilient ring element 111c is coupled to each of the inner and outer ring elements 111a, 111b such that rotation of the inner ring element may be transferred to the outer ring element or vice versa. For example, the resilient ring element 111c may be bonded to each of the inner and outer ring elements 111a, 111b. Additionally or alternatively, the resilient ring element 111c may comprise splines or any other features, which engage corresponding features in the inner and/or outer ring elements 111a, 111b to rotatably couple the ring elements together.

The resilient ring element 111c is made of a resilient material that allows the outer ring element 111b to be displaced in a radial direction relative to the inner ring element 111a. For example the resilient ring element 111c may be made from a rubber type material, such as Hydrogenated Nitrile Butadiene Rubber (HNBR).

The rotational axes 114, 124 of the first and second gears 110, 120 may be spaced apart such that the resilient ring element 111c is pre-stressed. For example, a portion of the resilient ring element 111c that is closest to where the first and second gears mesh may be under compression. By contrast, a portion of the resilient ring element 111c furthest from where the first and second gears mesh may be in tension.

The first and second gears 110, 120 may each comprise a positioning ring 113, 123. The first and second positioning rings 113, 123 are axially spaced apart from the gear teeth 112, 122 of the respective first and second gear. In particular, as shown, the first and second positioning rings 113, 123 are provided to one side of the first and second gear teeth 112, 122 respectively. The first and second positioning rings 113, 123 are configured to contact each other when the first and second gears mesh. In particular, the first and second positioning rings 113, 123 limit the position of the first and second gear teeth 112, 122 relative to each other.

The first gear positioning ring 113 is connected to the first gear outer ring element 111b, and in particular may be integral with the first gear outer ring element 111b. Accordingly, the first gear positioning ring 113 may move with the first gear outer ring element 111b relative to the inner ring element 111a. The first gear positioning ring 113 may be concentric with the first gear outer ring element 111b. However, the first gear positioning ring 113 may not necessarily be concentric with the inner ring element 111a during use of the gear assembly since the inner and outer ring elements may not be concentric during such use.

The first and second gear positioning rings may form a rolling contact. To increase friction and/or reduce wear, one or both of the first and second gear positioning rings 113, 123 may comprise an optional resilient outer layer 113', e.g., in the form of a rubber tire.

The second gear positioning ring 123 may be connected to the remainder of the second gear 120, in particular the second gear positioning ring 123 may be coupled to a portion of the second gear on which the second gear teeth 122 are provided. The second gear teeth 122 may be rigidly connected to a hub of the second gear and may remain concentric with the rotational axis 124. However, in an alternative arrangement the second gear 120 may comprise an intermediate resilient element similar to that described in respect of the first gear 110.

The first and second gear positioning rings 113, 123 are circular. Each of the first and second gear positioning rings 113, 123 may have an outer diameter that allows the gear teeth to mesh, but also allows the gear positioning rings to contact each other. For example, the first and second gear positioning rings may have outer diameters less than an outside diameter of the respective first and second gear. The outside diameter of a gear may be measured from tops of the gear teeth. Similarly, each of the first and second gear positioning rings 113, 123 may have an outer diameter greater than a root diameter of the respective first and second gears. The root diameter may be measured from roots of the gear teeth, e.g., between the tops of the teeth.

To limit slip between the first and second gear positioning rings 113, 123, the outer diameters of the positioning rings may substantially correspond to a pitch circle diameter of the respective gear. For example, the outer diameter of the first gear positioning ring 113 may substantially correspond to a pitch circle diameter of the first gear 110. Likewise, the outer diameter of the second gear positioning ring 123 may substantially correspond to a pitch circle diameter of the second gear 120. The pitch circles of each gear may correspond to circles with the same gear ratio as the first and second gears, the circles contacting and rolling without slip. It will be appreciated, that the pitch circle diameter of each gear may be between the outside diameter and the root diameter of the respective gear.

The rotational axes 114, 124 may be spaced apart such that the resilient ring element 111c remains in a stressed condition during use of the gear assembly 100. The resilient element 111c may thus ensure that the first and second gear positioning rings 113, 123 remain in contact during use and that backlash between the gears may be minimised. The first and second gear positioning rings 113, 123 may also ensure that the teeth of one gear do not extend too far into the gaps between teeth of the other gear, thereby avoiding the gears locking, generating imperfect contact and/or noise.

The gear assembly 100 may be configured such that the gear positioning rings 113, 123 remain in contact during use of the gear assembly. For example, the diameter of the gears, the resilience of the resilient element, the radial thickness of the resilient element and/or the spacing apart of the first and second gears may be selected such that the resilient ring element 111c remains in a stressed state during normal use of the gear assembly. In the stressed state, the resilient element 111c provides a force urging the first gear 110 into mesh with the second gear 120. Normal use of the gear assembly 100 corresponds to anticipated variations in the axes of rotation 114, 124, e.g., as caused by thermal expansions, bearing tolerances and/or shaft/bearing dynamics.

Figure 4:
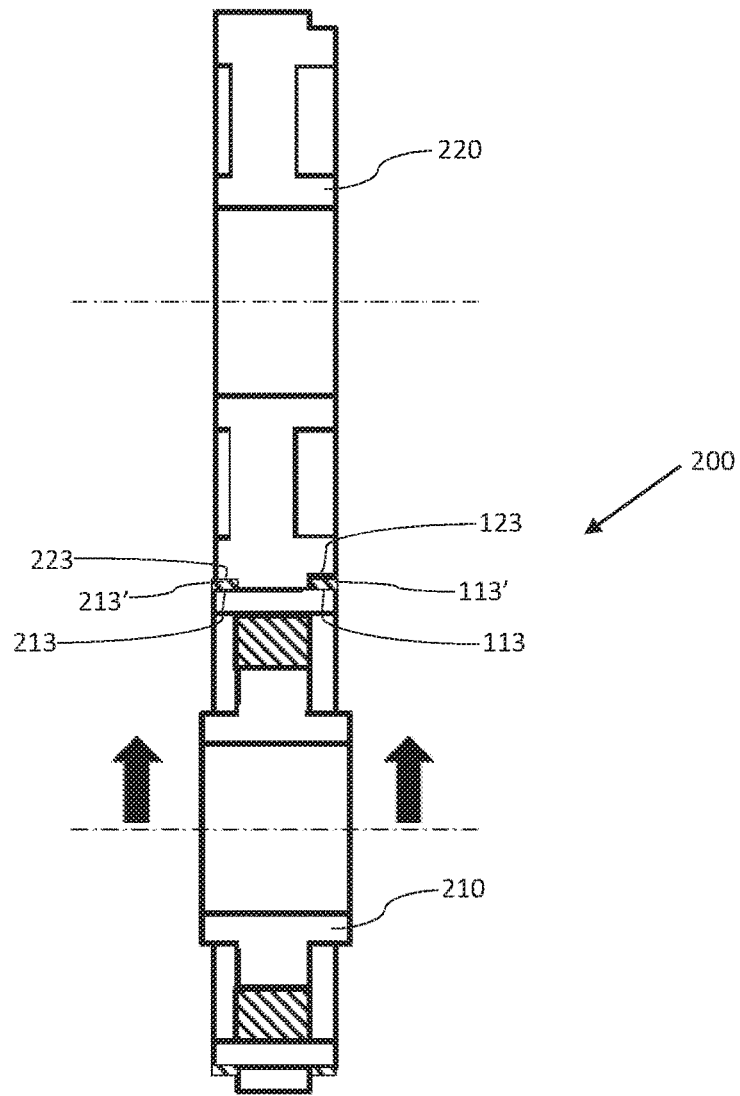
FIG. 4 is a side sectional view showing first and second gears according to an alternative arrangement of the present disclosure.
Figure 5:
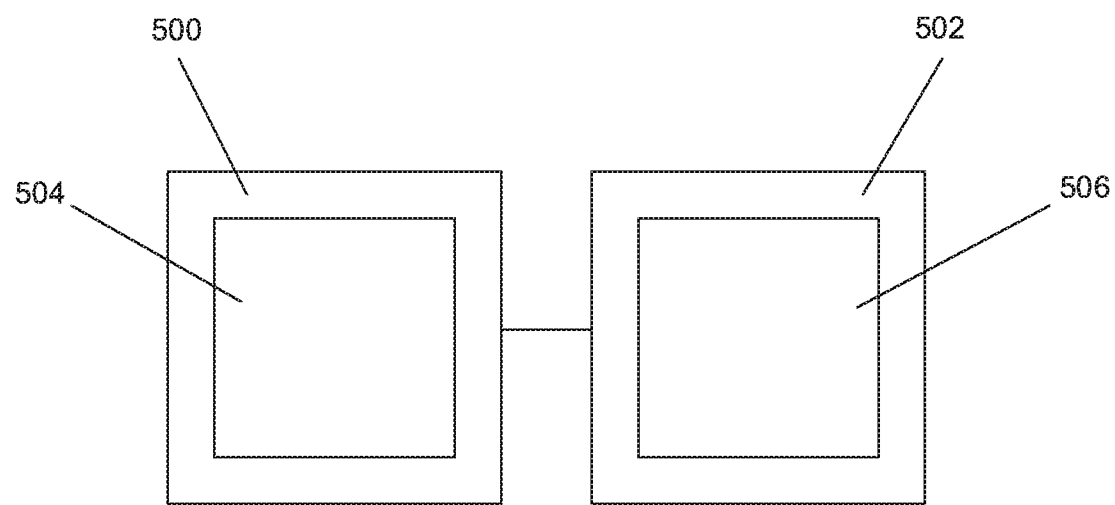
FIG. 5 depicts a first gear 500 with a first resilient ring element 504 and a second gear 502 with a second resilient ring element 506.

With reference to FIG. 4, a gear assembly 200, according to an alternative arrangement of the present disclosure, may comprise first and second gears 210, 220 each comprising a further positioning ring 213, 223 in addition to the positioning rings 113, 123. The further positioning rings are axially spaced apart from the first and second gear teeth and are provided on an opposing side of the first and second gear teeth to the positioning rings 113, 123. The further positioning rings 213, 223 are configured to engage each other and limit the position of the first and second gear teeth relative to each other. It will be appreciated that features described above in respect of the positioning rings 113, 123 may apply equally to the further positioning rings 213, 223. For example, one or both of the further positioning rings 213, 223 may comprise an optional resilient outer layer 213', e.g., in the form of a rubber tire.

The gear assemblies 100, 200 described herein may be used in an internal combustion engine. In particular, the gear assemblies 100, 200 may be used to rotatably couple a crankshaft to a balancer shaft of the engine. Such shafts may be subject to radial displacements due to the loads applied. The gear assemblies described herein may help to ensure that the gears remain engaged during such radial displacements and limit backlash between the gears.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It will be appreciated by those skilled in the art that although the disclosure has been described by way of example, with reference to one or more examples, it is not limited to the disclosed examples and alternative examples may be constructed without departing from the scope of the disclosure as defined by the appended claims.

The invention claimed is:

1. A gear assembly comprising first and second gears configured to mesh with each other;
   the first gear comprising inner and outer ring elements and a resilient ring element;
   the resilient ring element including an inner face in face sharing contact with an entire outer circumferential face of the inner ring element and an outer face in face sharing contact with an entire inner circumferential face of the outer ring element, the resilient ring element forming a circumferential layer separating the inner and outer ring elements and rotational axes of the first and second gears separated by a distance such that a thickness of the circumferential layer is compressed in a radial direction on a side of a mesh point between the first and second gears;
   the outer ring element comprising first gear teeth which mesh with second gear teeth of the second gear;
   wherein the first and second gears each comprise a circular positioning ring axially spaced apart from the first and second gear teeth and positioned to limit travel of the first and second gear teeth into one another, and the compression of the resilient ring element presses the circular positioning rings into rolling contact with one another.

2. The gear assembly of claim 1, wherein the first gear positioning ring is connected to the first gear outer ring element and compressing the circumferential layer reduces a distance between the inner face of the resilient ring element and the outer face of the resilient ring element.

3. The gear assembly of claim 1, wherein the first and/or second gear positioning rings comprise a resilient outer layer between the positioning ring surfaces in rolling contact.

4. The gear assembly of claim 1, wherein each of the first and second gear positioning rings has an outer diameter less than an outside diameter of the respective first and second gears, the outside diameter being measured from tops of the respective first and second gear teeth.

5. The gear assembly of claim 1, wherein each of the first and second gear positioning rings has an outer diameter greater than a root diameter of the respective first and second gears, the root diameter being measured from roots of the respective first and second gear teeth.

6. The gear assembly of claim 1, wherein the resilient ring element extends around an entire circumference of the gear assembly to completely separate the inner ring element and the outer ring element; and
   wherein the first and second gear positioning rings form rolling contact.

7. The gear assembly of claim 6, wherein the first and second gears each comprise a further positioning ring axially spaced apart from the first and second gear teeth, the further positioning rings being provided on an opposing side of the first and second gear teeth to the positioning rings.

8. The gear assembly of claim 1, wherein the resilient ring element is coupled to the outer and/or inner ring elements by one or more splines.

9. An engine or motor vehicle with a gear assembly, comprising:
   first and second gears configured to mesh with each other,
   the first gear comprising inner and outer ring elements separated by a circumferential layer of a resilient ring element,
   the resilient ring element including an inner resilient ring face in face sharing contact with an entire outer circumferential face of the inner ring element and an outer resilient ring face in face sharing contact with an entire inner circumferential face of the outer ring element and the resilient ring element separating the inner and outer ring elements,
   rotational axes of the first and second gears separated by a distance such that a radial thickness of the circumferential layer of the resilient ring element is compressed adjacent to a mesh point of the first and second gears,
   the outer ring element comprising first gear teeth which mesh with second gear teeth of the second gear, wherein the first and second gears each comprise a circular positioning ring axially spaced apart from the first and second gear teeth and the positioning rings positioned to limit travel of the first and second gear teeth into one another and the compression of the resilient ring element presses the circular positioning rings into rolling contact with one another.

10. The engine or motor vehicle with the gear assembly of claim 9, wherein the first and second gears each comprise a further positioning ring axially spaced apart from the first and second gear teeth, the further positioning rings being provided on an opposing side of the first and second gear teeth to the positioning rings, the further positioning rings being configured to engage each other and limit a position of the first and second gear teeth relative to each other.

11. A gear assembly comprising:
   first and second meshing gears each having inner and outer ring elements separated by a layer of a resilient ring element;
   the resilient ring element comprising an inner resilient ring face in face sharing contact with an entire outer circumferential face of the inner ring element and an outer resilient ring face in face sharing contact with an entire inner circumferential face of the outer ring element;
   the outer ring element including first teeth meshing with second teeth of the second gear; and
   the first and second gears each including a circular positioning ring axially spaced from the first and second teeth and positioned to limit travel of the first and second gear teeth into one another and compression of the resilient ring element,
   wherein a distance between rotational axes of the first and second meshing gears compresses a radial thickness of each layer of the resilient ring element by a preload, presses the circular positioning rings into rolling contact with one another, and radially displaces each inner ring element toward a mesh point.

12. The gear assembly of claim 1, wherein the resilient ring element is compressed such the layer of the resilient ring element is in tension and thicker on a side of the first gear opposite the mesh point.

13. The engine or motor vehicle with the gear assembly of claim 9, wherein the positioning rings are in rolling contact and are pressed into contact by the compression of the circumferential layer of the resilient element.

14. The gear assembly of claim 11, wherein the resilient ring elements have a smaller width than the outer ring elements and the circular positioning rings which are integral.

15. The engine or motor vehicle with a gear assembly of claim 9, wherein the positioning rings extend parallel to the rotational axes and a width of the positioning rings and the outer ring element is greater than that of the resilient ring element.

16. The gear assembly of claim 1, wherein the first and second gear positioning rings extend perpendicular from a face of the outer ring element such that the outer ring element is wider than the resilient ring element and the inner ring element.

* * * * *